Sept. 4, 1934.     T. H. JACOB     1,972,564
AXLE
Filed May 22, 1933     2 Sheets-Sheet 1
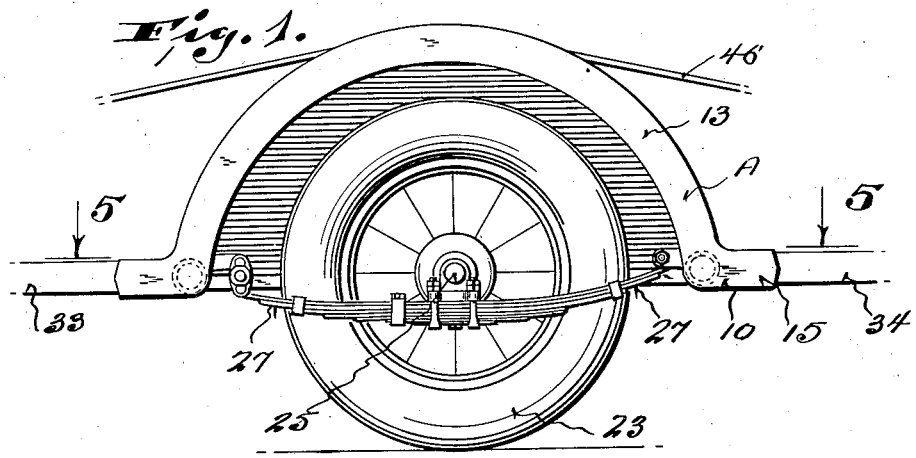
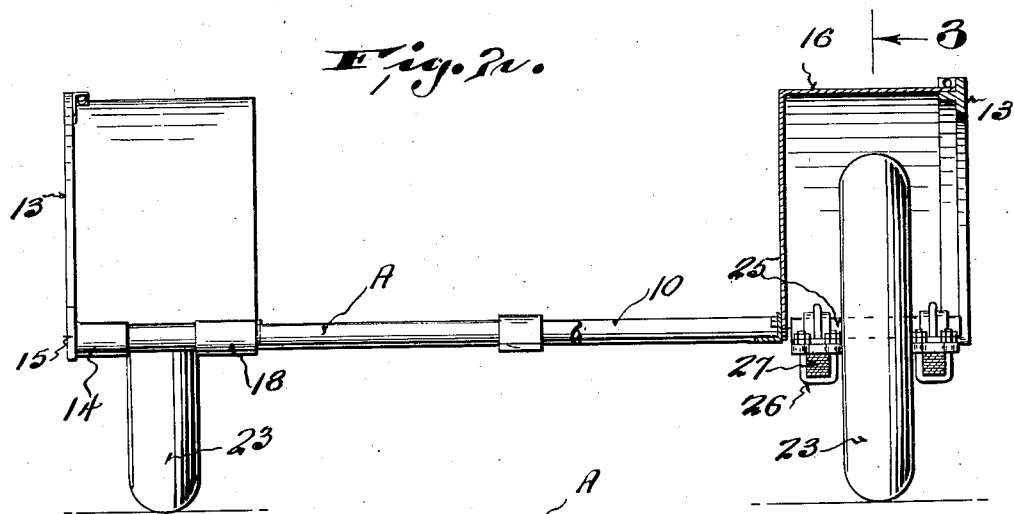
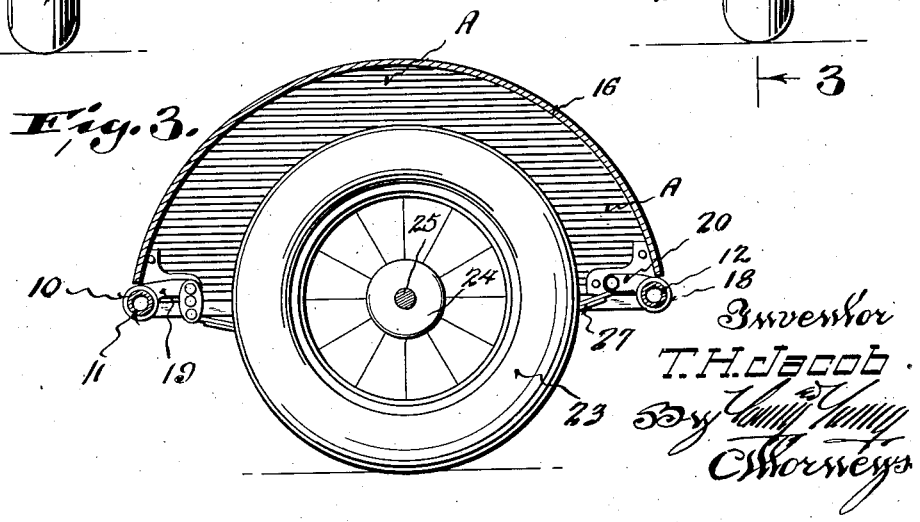
Inventor
T. H. Jacob Sept. 4, 1934.  T. H. JACOB  1,972,564
AXLE
Filed May 22, 1933  2 Sheets-Sheet 2
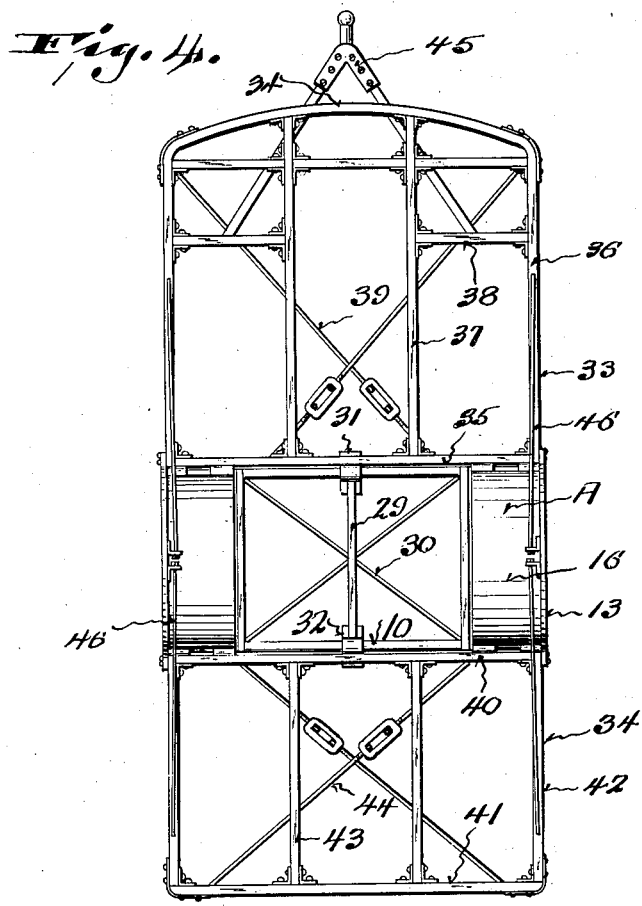
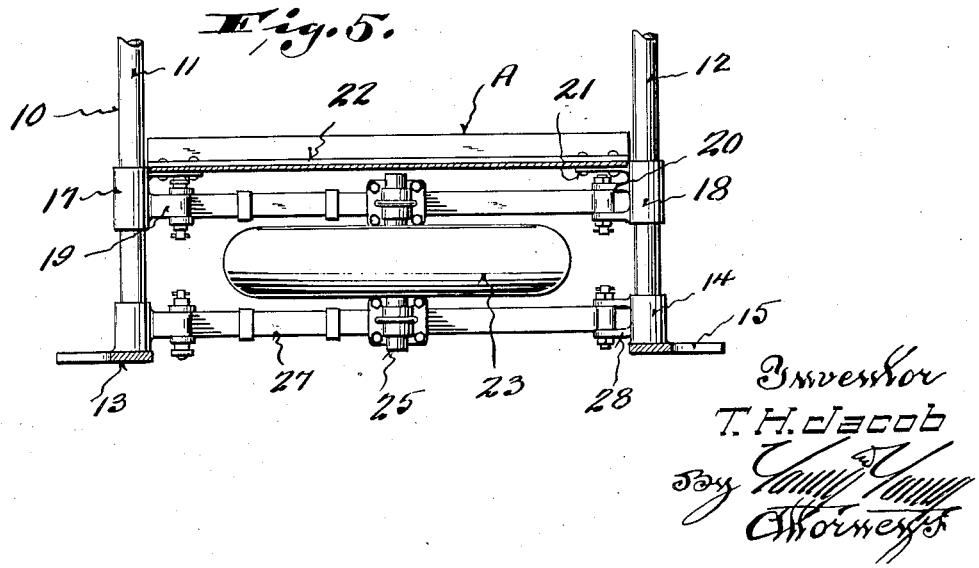

Patented Sept. 4, 1934

1,972,564

UNITED STATES PATENT OFFICE 1,972,564

AXLE

Thomas H. Jacob, Wausau, Wis.

Application May 22, 1933, Serial No. 672,245

9 Claims. (Cl. 280—106.5)

This invention appertains to trailers of the type particularly adapted to be attached to and drawn by motor vehicles.

A great many persons prefer to build or have especially built trailers to conform to their particular requirements and needs, such as for hauling boats, and tourists' living quarters or for hauling bulk objects such as farm produce.

Some manufacturers do quite a business in supplying parts (such as tongues and hitches) for such trailers. However, considerable difficulty has been experienced by these builders in obtaining proper axles and there is a demand for an efficient axle unit for trailers.

In all trailers with which I am familiar, a transverse axle is used with springs interposed between such axle and the chassis or body of the trailer. This makes too high a trailer and the springs are inside the wheels, which leaves a narrow spring support. Thus, the vehicle is going to be top-heavy and the same will roll on country roads and on uneven ground. Where effort is made to build the trailer low, insufficient clearance is given between the bottom of the body and axle and the roadway.

It is therefore one of the primary objects of my invention to provide a trailer axle unit which first will permit any desired type of trailer to be built thereon and, second, which will give a high clearance under the trailer and a low floor line, which consequently will result in creating a trailer having a low center of gravity.

Another salient object of my invention is to provide a novel axle unit for trailers embodying novel means for supporting the wheels relative to the frame of such unit whereby not only is a low center of gravity with a high clearance insured, but whereby an adequate and efficient spring support will be had, which will eliminate the narrow spring support common in ordinary trailers, as pointed out above.

A further important object of my invention is to provide a novel frame for the axle unit whereby different types of trailer frames can be readily connected thereto, so that the desired and particular type of trailer can be built.

A still further object of my invention is to provide a novel trailer axle unit of the above character, which will be durable and efficient in use, one that will be simple and easy to manufacture and one which can be placed upon the market at a low cost.

With these and other objects in view, the invention consists in the novel construction, arrangement, and formation of parts, as will be hereinafter more specifically described, illustrated, and claimed in the accompanying drawings, in which:—

Figure 1 is a side elevation of my improved trailer axle unit showing parts of the trailer frame sections connected therewith.

Figure 2 is a rear elevation of my improved trailer unit with parts thereof broken away and in section to illustrate my novel spring support.

Figure 3 is a vertical section taken on the line 3—3 of Figure 2 looking in the direction of the arrows.

Figure 4 is a top plan view showing one type of trailer which can be built with my improved axle unit.

Figure 5 is a horizontal section through my improved axle unit taken on the line 5—5 of Figure 1 looking in the direction of the arrows.

Referring to the drawings in detail, wherein similar reference characters designate the corresponding parts throughout the several views, the letter A generally indicates my improved trailer axle unit, which comprises a frame 10.

This frame 10 embodies a pair of spaced parallel axle bars 11 and 12 which extend entirely across the trailer. These axle bars may, and preferably are, formed from steel tubes of the desired gauge and size. The outer ends of the axle bars 11 and 12 are rigidly secured to, such as by welding or the like, connecting arch frame bars 13. These bars 13 can be of a T-shape in cross section with their horizontal flanges extending inwardly for a purpose, which will later appear, and are preferably made from a malleable iron casting. As illustrated, the lower ends of the arch frame bars 13 may carry inwardly directed cuffs 14 for receiving the terminals of the axle frame bars 11 and 12. The extreme lower ends of the arch bars 13 carry oppositely extending horizontally disposed feet 15 for a purpose which will later appear.

Riveted or otherwise suitably secured to the horizontal flanges of the arch frame bars 13 are sheet metal wheel fenders 16 and these fenders are preferably made from relatively thick metal. Secured to the axle frame bars 11 and 12 in spaced relation to the cuffs 14 are sleeves 17 and 18. These sleeves 17 are carried by the rear axle bar 11 while the sleeves 18 are carried by the front axle bar 12, and the sleeves 17 have formed thereon a supporting pivot ear 19 while the sleeves 18 have formed thereon pairs of spaced pivot ears 20. All of the sleeves 17 and 18 have formed thereon inwardly directed arms 21 to which are riveted or otherwise suitably secured the lower inner edge of the skirt of the fenders. If desired these portions of the fenders can be braced by angle iron strips 22 which have their terminals riveted to the arms 21 and thus, these angle arms serve to brace the axle bars and form a rigid frame.

Arranged between the cuffs 14 and the sleeves 17 and 18 on each side of the frame are the supporting wheels 23 which can be of any desired construction. The hubs 24 of the wheels receive short floating axles 25 and the opposite ends of these axles are securely connected by means of clips 26 to the central portions of semi-elliptical leaf springs 27. Thus, it is to be noted that a spring is arranged both in the inside and outside of each wheel. The cuffs 14 also carry pivot ears 28 similar to the pivot ears carried by the sleeves 17 and 18 and the ends of the leaf springs are connected by means of suitable shackles and spring bolts with the ears 19, 20 and 28.

The frame can be braced in any other preferred manner and as shown, I have provided a central frame bar 29 and diagonally extending crossed tie rods 30.

By referring to Figures 2 and 4, it will be noted that the central portion of the tubular frame bars 11 and 12 have rigidly secured thereto brackets 31 and 32 and these brackets extend both on the inside and outside of the frame. Those portions of the brackets which extend inside of the frame form means for securing the central brace bar 29 in place.

The feet 15 carried by the arch frame bars 13 and those parts of the brackets 31 and 32 which extend exteriorly of the frame form means for permitting the attaching of different types of trailer frame work to my trailer axle unit.

In Figure 4 I have illustrated one type of trailer which can be built on my unit and as shown, the same embodies front frame section 33 and a rear frame section 34. The front frame section 33 may comprise front and rear frame bars 35 and longitudinally extending beams 36. Intermediate frame bars 37 can be bolted or otherwise secured to the front and rear frame bars 35, and transverse frame bars 38 are provided for connecting the intermediate frame bars with the beams 36. Likewise, diagonally extending crossed tie rods 39 are also provided.

The rear section 34 is similar to the front section and embodies front and rear frame bars 40 and 41 and connecting longitudinally extending side beams 42. Intermediate frame bars 43 can also be provided for connecting the front and rear bars 40 and 41 together and I can also provide crossed diagonally extending tie rods 44. The rear frame bar 35 of the front section and the front frame bar 40 of the rear section are securely bolted or otherwise fastened to the brackets 31 and 32 and to the feet 15.

A suitable tongue or draft bar 45 is provided for permitting the convenient attaching of the trailer to the preferred part of the motor vehicle (not shown).

If desired, I can provide longitudinally extending tie rods 46 for bracing the front and rear sections and the axle unit sections, and these tie rods can be securely fastened to the arch frame bars 13.

From the foregoing description, it can be seen that I have provided a novel trailer axle unit on which various types of trailer frames can be built and in which an exceptionally low center of gravity is provided with a maximum amount of clearance between the bottom of the trailer and the roadway. Likewise, it can be seen that a novel spring suspension has been provided in which a maximum amount of spring support is given with a novel spring spacing with the spread of the springs practically the width of the trailer unit.

Changes in details may be made without departing from the spirit or the scope of this invention, but what I claim as new is:—

1. As a new article of manufacture, a central axle chassis unit for trailers comprising a frame including a pair of spaced parallel frame bars, floating stub axles arranged intermediate the ends of the frame bars, wheels on said axles, and springs connected with the axle ends and with the frame bars.

2. In a trailer, a trailer axle unit comprising a pair of spaced parallel axle bars, arched frame bars connecting the terminals of the axle bars together, a pair of spaced springs at each end of the axle bars having their terminals connected to said axle bars, a pair of floating axles connected to the intermediate portions of the pairs of springs, and ground wheels rotatably mounted on said axles.

3. In a trailer, a trailer axle unit comprising a pair of spaced parallel axle bars, arched frame bars connecting the terminals of the axle bars together, a pair of spaced springs at each end of the axle bars having their terminals connected to said axle bars, a pair of floating axles connected to the intermediate portions of the pairs of springs, ground wheels rotatably mounted on said axles, and oppositely extending attaching feet on the arched frame bars.

4. In a trailer, an independent axle unit including a pair of spaced parallel axle bars, arched frame bars having inwardly directed cuffs receiving the terminals of the axle bars, an arched fender secured to each of the frame bars, sleeves on the axle bars arranged in spaced relation to the cuffs, pivot ears on said cuffs and sleeves, pairs of spaced semi-elliptical leaf springs connected to said ears, short floating axles rigidly secured to intermediate portion of the springs between the axle bars, and ground wheels rotatably mounted between the springs on the axles.

5. In a trailer, an independent axle unit including a pair of spaced parallel axle bars, arched frame bars having inwardly directed cuffs receiving the terminals of the axle bars, an arched fender secured to each of the frame bars, sleeves on the axle bars arranged in spaced relation to the cuffs, pivot ears on said cuffs and sleeves, pairs of spaced semi-elliptical leaf springs connected to said ears, short floating axles rigidly secured to an intermediate portion of the springs between the axle bars, ground wheels rotatably mounted between the springs on the axles, oppositely extending attaching feet on the terminals of the arched bars, and attaching brackets secured to the intermediate portion of the axle bars.

6. In a trailer, an independent axle unit including a pair of spaced parallel axle bars, arched frame bars having inwardly directed cuffs receiving the terminals of the axle bars, an arched fender secured to each of the frame bars, sleeves on the axle bars arranged in spaced relation to the cuffs, pivot ears on said cuffs and sleeves, pairs of spaced semi-elliptical leaf springs connected to said ears, short floating axles rigidly secured to an intermediate portion of the springs between the axle bars, ground wheels rotatably mounted between the springs on the axles, oppositely extending attaching feet on the terminals of the arched bars, attaching brackets secured to the intermediate portion of the axle bars, front and rear trailer frame sections, and means connecting the inner ends of the frame sections to said feet and said brackets.

7. A trailer comprising a central axle chassis unit, including a frame having a pair of spaced parallel frame bars, floating stub axles arranged intermediate the ends of the frame bars, wheels on said axles, springs connected with the axle ends and with the frame bars, and removable body sections for said unit, each including front and rear frame bars and connecting side bars, and means detachably and rigidly connecting the body sections to the front and rear of the unit.

8. A trailer comprising a central trailer axle unit comprising a pair of spaced parallel axle bars, arched frame bars connecting the terminals of the axle bars together, a pair of spaced springs at each end of the axle bars having their terminals connected to said axle bars, a pair of floating axles connected to the intermediate portions of the pairs of springs, ground wheels rotatably mounted on said axles, removable body sections for said axle unit, each including front and rear frame bars and connecting side bars, the rear frame bar of one body section and the front frame bar of the other body section being disposed in close proximity to the axle bars of the axle unit, and means detachably and rigidly connecting the body sections to the unit.

9. A trailer comprising an independent axle unit including a pair of spaced parallel axle bars, arched frame bars having inwardly directed cuffs receiving the terminals of the axle bars, an arched fender secured to each of the frame bars, a pair of spaced springs at each end of the axle bars having their terminals connected to said axle bars, a pair of floating axles connected to the intermediate portions of the pairs of springs, ground wheels rotatably mounted on said axles, oppositely extending attaching feet on the terminals of the arched bars, and removable body sections for said unit, each including front and rear frame bars and connecting side bars, means rigidly and detachably connecting said body sections to the attaching feet, and tie-rods connected to said body sections and extending over and attached to the arched bars.

THOMAS H. JACOB.